United States Patent
Park

(10) Patent No.: US 9,828,683 B2
(45) Date of Patent: Nov. 28, 2017

(54) APPARATUS FOR PRODUCING SLIGHTLY WEAK ACIDIC HYPOCHLOROUS ACID WATER

(71) Applicant: Cosmic Round Korea Co., Ltd., Gyeonggi-do (KR)

(72) Inventor: Bum Jin Park, Seoul (KR)

(73) Assignee: COSMIC ROUD KOREA CO., LTD., Gyeonggi-Do (KR)

( * ) Notice: Subject to any disclaimer, the term of this patent is extended or adjusted under 35 U.S.C. 154(b) by 374 days.

(21) Appl. No.: 14/418,404

(22) PCT Filed: Aug. 1, 2013

(86) PCT No.: PCT/KR2013/006936
§ 371 (c)(1),
(2) Date: Jan. 29, 2015

(87) PCT Pub. No.: WO2014/021655
PCT Pub. Date: Feb. 6, 2014

(65) Prior Publication Data
US 2015/0211133 A1    Jul. 30, 2015

(30) Foreign Application Priority Data

Aug. 1, 2012    (KR) ........................ 10-2012-0084508

(51) Int. Cl.
C25B 1/26 (2006.01)
C25B 15/08 (2006.01)
(Continued)

(52) U.S. Cl.
CPC .............. *C25B 1/26* (2013.01); *C02F 1/4618* (2013.01); *C02F 1/4674* (2013.01); *C25B 9/00* (2013.01);
(Continued)

(58) Field of Classification Search
CPC ... C25B 1/26; C25B 9/06; C25B 15/08; C02F 1/4618
See application file for complete search history.

(56) References Cited

U.S. PATENT DOCUMENTS 4,334,968 A * 6/1982 Sweeney ............. C02F 1/46109
204/256
2006/0054510 A1* 3/2006 Salerno ................. C02F 1/4674
205/335

(Continued)

FOREIGN PATENT DOCUMENTS

JP    2011-104519    6/2011
KR    10-2005-0119250    12/2005
(Continued)

OTHER PUBLICATIONS

International Search report and Written Opinon issued in a corresponding PCT/KR2013/006936 dated Aug. 26, 2013.

*Primary Examiner* — Nicholas A Smith
(74) *Attorney, Agent, or Firm* — Roberts Mlotkowski Safran Cole & Calderon P.C.

(57) ABSTRACT

The present invention relates to an electrolyzed water manufacturing device for producing hypochlorous acid water containing hypochlorous acid using hydrochloric acid as an electrolyte, comprising: a hydrochloric acid container for storing the hydrochloric acid as the electrolyte; an electrolytic bath which is connected to the hydrochloric acid container, includes an electrode, and produces slightly weak acidic hypochlorous acid water containing a high-density chlorine solution through electrolysis of the hydrochloric acid; a hydrochloric acid supply pump provided between the hydrochloric acid container and the electrolytic bath so as to supply the hydrochloric acid to the electrolytic bath; and a venturi pipe which is connected to an upper part of the electrolytic bath, is formed between an inlet and an outlet (Continued)

through which dilution water passes, includes a neck part having a smaller pipe diameter in comparison with the inlet and the outlet, and an extraction pipe for connecting the neck part and the electrolytic bath, such that the high-density chlorine solution generated from the electrolytic bath is aspirated through the reduction of the pressure generated from the neck part when the dilution water passes through, and the aspirated high-density chlorine solution is diluted using the dilution solution and the diluted high-density chlorine solution is discharged. The apparatus for producing slightly weak acidic hypochlorous acid water, according to the present invention further, comprises: a discharging pipe connected to the outlet of the venturi pipe; and a screw blade which is inserted into the discharging pipe and accelerates the contact reaction between the high-density chlorine solution discharged from the non-diaphragm type electrolytic bath and the dilution water, wherein the screw blade is preferably composed of flexible plastic material.

1 Claim, 2 Drawing Sheets

(51) Int. Cl.
*C25B 9/06* (2006.01)
*C02F 1/461* (2006.01)
*C02F 1/467* (2006.01)
*C25B 9/00* (2006.01)

(52) U.S. Cl.
CPC ............... *C25B 9/06* (2013.01); *C25B 15/08* (2013.01); *C02F 2201/4614* (2013.01); *C02F 2201/46145* (2013.01)

(56) References Cited

U.S. PATENT DOCUMENTS

| | | | | |
|---|---|---|---|---|
| 2008/0003507 | A1* | 1/2008 | Nanjundiah | .......... C01B 11/023 429/326 |
| 2009/0242419 | A1* | 10/2009 | Aldridge | ............... C02F 1/4674 205/335 |
| 2010/0288626 | A1* | 11/2010 | Kuan | ..................... C02F 1/4674 204/228.1 |
| 2012/0255866 | A1* | 10/2012 | Wong | ..................... C02F 1/4618 205/556 |
| 2014/0217035 | A1* | 8/2014 | Poyet | .................... C02F 1/4674 210/748.2 |
| 2015/0027880 | A1* | 1/2015 | Kim | ......................... C25B 1/26 204/278 |

FOREIGN PATENT DOCUMENTS

| | | |
|---|---|---|
| KR | 10-0794106 | 1/2008 |
| KR | 10-0970708 | 7/2010 |
| KR | 20-0454214 | 6/2011 |

\* cited by examiner

APPARATUS FOR PRODUCING SLIGHTLY WEAK ACIDIC HYPOCHLOROUS ACID WATER

TECHNICAL FIELD

The present invention relates to an electrolyzed water manufacturing device for producing hypochlorous acid water containing hypochlorous acid using hydrochloric acid as an electrolyte, and in particular to an apparatus for producing slightly weak acidic hypochlorous acid water in such a way that diluted hydrochloric acid is fed into an electrolytic bath which does not has any diaphragm and is electrolyzed, and the thusly produced high-density chlorine solution is diluted with water and is reacted.

BACKGROUND ART

Slightly weak acidic hypochlorous acid water may be manufactured in such a way that diluted hydrochloric acid solution of 2~6% is fed using a metering pump into a diaphragmless electrolytic bath wherein a cathode and an anode are arranged facing each other.

More specifically describing, a hydrogen generation reaction occurs at the cathode electrode as follows.

$$2H_2O \longrightarrow 2H_2 + 4OH^-$$ [Reaction Formula 1]

The following oxygen generation reaction occurs at the anode electrode.

$$2H_2O \longrightarrow O_2 + 4H^+$$ [Reaction Formula 2]

At the same time, the chlorine ion of the hydrochloric acid solution is oxidized at the anode electrode as follows.

$$2Cl^- \longrightarrow Cl_2 + 2e$$ [Reaction Formula 3]

In addition, part of $Cl_2$ generated at the anode electrode reacts with water as follows, thus generating hypochlorous acid.

$$Cl_2 + H_2O \longrightarrow HOCl + HCl$$ [Reaction Formula 4]

As a result of the above reaction, high-density chlorine solution and hypochlorous acid solution are generated in the diaphragmless electrolytic bath, and the generated mixture liquid is properly diluted with water, and the chlorine solution and water are reacted, thus generating hypochlorous acid, and pH of the generated solution is regulated to 5.0 to 5.5, thus generating slightly weak acidic hypochlorous acid water wherein the chlorine contained in the generated water consists of only hypochlorous acid.

As compared with $Cl_2$, $NaOCl$, etc. which are chlorine-based sterilizers and disinfectants, the hypochlorous acid has more than 80 times stronger in sterilizing powder, and stimulation smell seems to be weak, and the toxicity against humans and animals is less than 1/100, but the hypochlorous has instant sterilizing power against all kinds of microorganism such as bacteria, fungus, virus, etc. and is decomposed into harmless substances, so any environmental load becomes very low.

Thanks to the above-mentioned characteristics, the slightly weak acidic hypochlorous acid water containing hypochlorous acid water may be used for food sanitization, namely, for the disinfection of main ingredients or sub-ingredients of foods, and sterilization and disinfection of tools for food, container and facilities, and sterilization agricultural pesticides and substitutes for other disinfection agents in case of the growth of crop and livestock industry, and may be also widely used for the disinfection of medical tools, skin therapy of skin such as a cut, a pressure sore, etc., and a public disease prevention such as air sterilization and bad smell elimination based on spray into air. Therefore, the apparatus for producing slightly weak acidic hypochlorous acid water may be one of the very useful apparatuses in terms of industry.

The apparatus for producing slightly weak acidic hypochlorous acid water for industry in general has a production capacity per hour of 500 to 10,000 liters, and has a production capacity per hour of 50,000 liters for the large scale production. In addition to the above-mentioned large scale industrial purpose, there is a large demand for the apparatus which is capable of manufacturing a small amount of slightly weak acidic hypochlorous acid water, which corresponds to 50 to 200 liters production per hour for the economical use at home, small-scale restaurants, a small-scale cultivation under structure, a small-scale hospital, a dental hospital, an orphanage, a nursing home, etc.

DISCLOSURE OF INVENTION

Technical Problem

However, in case of such a small capacity manufacturing apparatus, the hydrochloric acid of the hydrolyte which is supplied into the diaphragmless electrolytic bath and is consumed, is a very small amount of 1 to 2 ml per minute on the basis of 3% concentration, so it needs to use a supply pump with a very small solution injection amount, and if the injection amount is small, the injection pressure may be lowered, thus causing a problem where when the high-density chlorine solution generated in the electrolytic bath is diluted and reacted with water, the chlorine solution may not be well mixed with the water.

FIG. 4 is a view illustrating a configuration of a conventional apparatus for producing slightly weak acidic hypochlorous acid water. The conventional apparatus may include a dilution water supply tube 1, a hydrochloric acid container 5, a hydrochloric acid supply pump 7, an electrolytic bath housing 9, an electrode 10, an electric power device 11, a water inlet unit 14, a water outlet unit 16, a discharge tube 17, a gas-liquid contact member 21, etc.

As illustrated in FIG. 4, according to the conventional method wherein the mixing reaction is performed in a state where the dilution water supply tube 1 and the high-density hydrochloric acid solution discharge tube 17 are orthogonal to each other, the high-density chlorine solution may not be mixed with dilution water unless the injection pressure of the electrolyte (hydrochloric acid) supply pump 7 is higher than the passage pressure of the dilution water supply tube 1, so it becomes impossible to generate a proper amount of slightly weak acidic hypochlorous acid water. In case of the small capacity slightly weak acidic electrolytic water, it is very expensive for the use of a pump which has a high discharge pressure while providing a small amount of discharge, so there may be a problem in commercialization.

Accordingly, it is an object of the present invention to provide an apparatus which is capable of stably generating slightly weak acidic hypochlorous acid water while lowering the manufacturing cost of slightly weak acidic hypochlorous acid water manufacturing apparatus with a small capacity.

Solution to Problem

To achieve the above objects, there is provided an apparatus for producing slightly weak acidic hypochlorous acid water which may include a hydrochloric acid container for storing hydrochloric acid using electrolyte; an electrolytic bath which is connected to the hydrochloric acid container and includes an electrode, thus producing slightly weak acidic hypochlorous acid water containing high-density chlorine solution based on electrolysis respect to the hydrochloric acid; a hydrochloric acid supply pump which is installed between the hydrochloric acid container and the electrolytic bath, thus supplying hydrochloric acid to the electrolytic bath; and a venturi tube which includes a neck part connected to the top of the electrolytic bath and disposed between an inlet and an outlet through the dilution water passes and having a tubular diameter smaller than the inlet and the output, respectively, and a discharge tube communicating through the neck part and the electrolytic bath, thus sucking the slightly weak acidic hypochlorous acid water generated in the electrolytic bath based on the drop of the pressure at the neck part when dilution water passes by and diluting the slightly weak acidic hypochlorous acid water with the dilution water.

The apparatus for producing slightly weak acidic hypochlorous acid water may preferably include a discharge tube connected to the outlet of the venturi tube; and a screw blade which is configured to promote a gas-liquid contact between vapor state chlorine contained in the high-density chlorine solution and the dilution water in such a way to make swirling turbulence in the flow of discharge of the slightly weak acidic hypochlorous acid water, and at this time, it is preferred that the screw blade is made from a flexible plastic material.

In addition, the apparatus for producing slightly weak acidic hypochlorous acid water may further include a dilution water supply tube connected to the mouth of the venturi tube; and an electromagnetic valve, a static pressure valve and a flow sensor which are installed at the dilution water supply tube, thus controlling the flow rate or pressure of the dilution water.

In addition, the apparatus for producing slightly weak acidic hypochlorous acid water may further include an electric power device for supplying electric power to the electrode of the electrolytic bath; and a current sensor which is connected to the electrode of the electrolytic bath and is configured to measure the value of current.

In addition, the apparatus for producing slightly weak acidic hypochlorous acid water may further include a control device which is connected through a signal cable to the hydrochloric acid supply pump, the electromagnetic valve, the static pressure valve, the electric power device and the current sensor, thus controlling the hydrochloric acid supply pump, the electromagnetic valve, the static pressure valve, the electric power device and the current sensor, respectively.

In addition, the apparatus for producing slightly weak acidic hypochlorous acid water may further include an operation control panel which is connected to the control device for operating the control device, and a liquid crystal display panel connected to the operation control panel for displaying various information.

In the present invention, it is preferred that when the inner diameter of the dilution water supply tube is 7 mm, the tubular diameter of the neck part of the venturi tube is 2.2 to 2.8 mm.

In the present invention, it is preferred that the hydrochloric acid supply pump is a tube pump which has a discharge capacity of 1 to 25 mL/min, the maximum discharge pressure of 10 to 30 kPa, a geared motor of 10 to 30V, 1 to 5 of the number of rollers, 1 to 5 of the minimum strokes per minute, and 0.1 to 1 mL of the discharge amount per stroke.

Advantageous Effects

According to the present invention, a venturi tube with a neck part formed between an inlet and an outlet through which dilution water passes and having a diameter smaller than each of the inlet and the outlet and a discharge tube formed orthogonally crossing the neck part and communicating with the electrolytic bath is provided at the top of the diaphragmless electrolytic bath, so with the aid of the lowered pressure at the neck part when the dilution water passes by, it is possible to discharge at a lower pressure the slightly weak acidic hypochlorous acid water generated in the electrolytic bath. Therefore, the pump which has been used as a means or supplying chlorine to the electrolytic bath may be substituted with a low pressure discharge and small amount discharge pump.

In addition, in such a way to install a screw blade, which is a simple gas-liquid contact member, at a water outlet unit connected to the venturi tube, the gas-liquid contact may be efficiently acquired without the installation of any complicated gas-liquid contact device, and the compactness of the device may be secured accordingly, and the manufacturing cost and maintenance cost of the device may be saved a lot, which may lead to quality-enhanced products.

BEST MODES FOR CARRYING OUT THE INVENTION

The exemplary embodiment of the present invention will be described with reference to the accompanying drawings.

Figure 1:
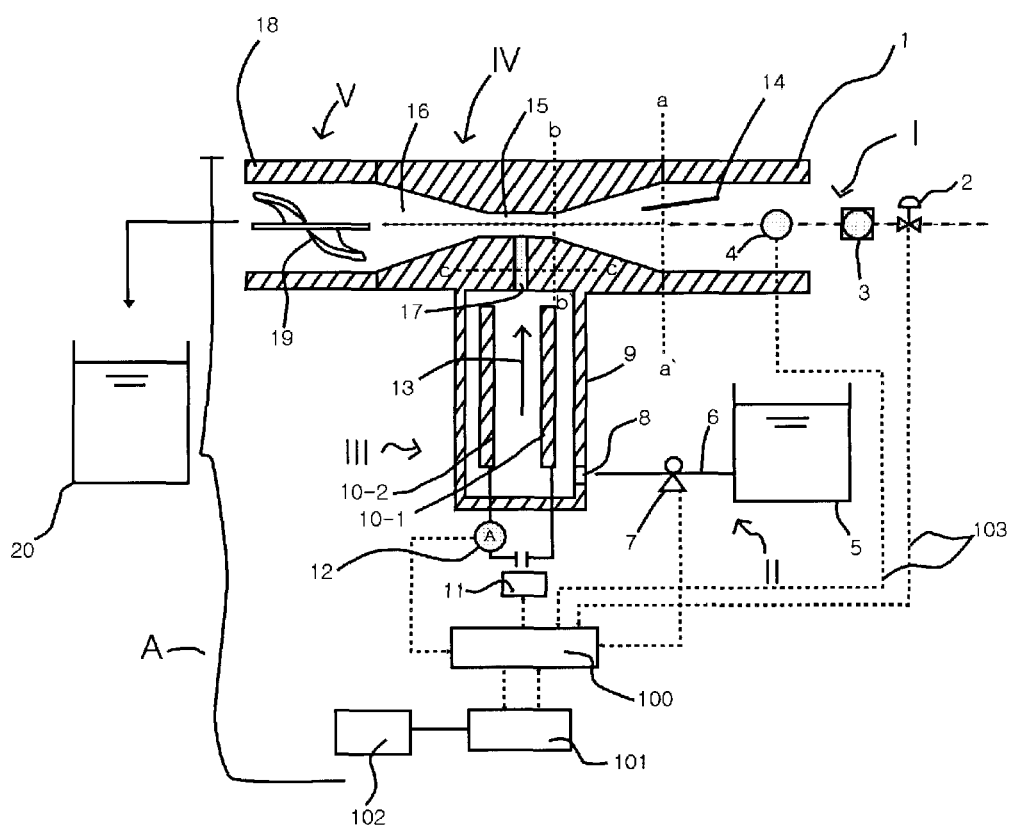
FIG. 1 is a view illustrating a construction of an apparatus for producing slightly weak acidic hypochlorous acid water according to the present invention.

FIG. 1 is a view illustrating a construction of an apparatus for producing slightly weak acidic hypochlorous acid water according to the present invention.

As illustrated therein, the slightly weak acidic hypochlorous acid water manufacturing apparatus 'A' may include an electrolysis unit formed of a diaphragmless electrolytic bath III and a venturi tube IV contacting with the top of the diaphragmless electrolytic bath III, a dilution water supply unit I, a hydrochloric acid supply unit II and a gas-liquid contact unit V.

The diaphragmless electrolytic bath III is where slightly weak acidic hypochlorous acid water containing chlorine solution is generated with the aid of the electrolysis of hydrochloric acid and may include an electrolytic bath housing 9, an electrode 10 and an electric power device 11 as required components, and preferably may further include a current sensor 12, a control device 100, an operation control panel 101, and a liquid crystal display panel 102.

The electrolytic bath housing 9 is a reaction tank where the electrolysis of hydrochloric acid occurs, and in which there is not any diaphragm between the electrodes 10. The hydrochloric acid supply port 8 is open at a side surface of the bottom of the electrolytic bath housing 9, and the hydrochloric acid supply tube 6 is connected to the hydrochloric acid supply port 8 and to a hydrochloric acid container 5.

The electrode 10 is installed inside of the electrolytic bath housing 9 and may be fixed and supported by a typical fixing unit. The electrode 10 consists of a cathode electrode 10-1 and an anode electrode 10-2, and the cathode electrode 10-1 and the anode electrode 10-2 are set to face each other by a predetermined interval between them. An electrode terminal is attached to the electrode 10 so as to supply electric power.

The electric power device 11 is connected to the electrode terminal so as to supply electric power to the electrode 10, preferably, so as to supply direct current electric power.

The current sensor 12 is installed at a connection cable connecting the anode electrode 10-2 and the electric power device 11, thus measuring current.

The control device 100 is connected through a signal cable 103 to an electromagnetic valve 2, a static pressure valve 3, a hydrochloric acid supply pump 7, an electric power device 11 and a current sensor 12.

The operation control panel 101 is connected to the control device 100, thus controlling the control device 100, and the liquid crystal display panel 102 is connected to the operation control panel 101 for thereby displaying a variety of information.

The venturi tube IV is installed at the top of the electrolytic bath housing 9 and may be secured to the electrolytic bath housing 9 by a welding method or may be integrally formed with the electrolytic bath housing 9.

The venturi tube IV may include at its left and right sides a water inlet unit 14 and a water outlet unit 16 which have large diameters, and a neck part 15 having a diameter smaller than each of the water inlet unit 14 and the water outlet unit 16 may communicate between the water inlet unit 14 and the water outlet unit 16. It is preferred that the diameters of the water inlet unit 14 and the water outlet unit 16 gradually decrease toward the neck part 15.

The center of the neck part 15 is orthogonal to the discharge tube 17, and the bottom of the discharge tube 17 is open to the interior of the diaphragmless electrolytic bath III, so high-density chlorine solution generated as hydrochloric acid is electrolyzed may be discharged through the discharge tube 17. Namely, when dilution water passes through the venturi tube IV, the slightly weak acidic hypochlorous acid water generated in the diaphragmless electrolytic bath III by means of the drop of pressure at the neck part 15 may be sucked into the venturi tube IV is diluted with the dilution water.

The gas-liquid contact unit V may include a generated water discharge tube 18 connected to the venturi tube IV, and the screw blade 19 is disposed inside of the discharge tube 18 so as to promote the gas-liquid contact for the high-density chlorine solution and the dilution water to be well mixed. The generated water which has passed through the gas-liquid contact unit V may be stored in the generated water storing container 20.

The dilution supply unit I may include a dilution water supply tube 1 connected to the venturi tube IV, and at the dilution water supply tube 1, the electromagnetic valve 2, the static pressure valve 3 and the flow sensor 4 are sequentially arranged in the direction of the supply of the dilution water. The flow rate or pressure of the dilution water may be controlled using the above-listed components. The electromagnetic valve 2 may be a solenoid valve which is a kind of an electronic valve. The dilution water of a predetermined flow rate may be inputted into the mouth of the venturi tube when the dilution water is inputted, based on a proper control of each of the electromagnetic valve 2, the static pressure valve 3 and the flow sensor 4, so the drop of the pressure of the neck part 15 of the venturi tube may be maintained constantly.

The hydrochloric acid supply unit II may include a hydrochloric acid container 5 configured to store hydrochloric acid which is electrolyte, and the hydrochloric acid container 5 and the hydrochloric acid supply port 8 of the electrolytic bath housing 9 are connected through the hydrochloric acid supply tube 6, and the hydrochloric acid supply pump 7 is installed at the hydrochloric acid supply tube 6, and the hydrochloric acid of the hydrochloric acid container 5 may be supplied into the interior of the diaphragmless electrolytic bath Ill based on the operation of the hydrochloric acid supply pump 7.

The operations of the slightly weak acidic hypochlorous acid water manufacturing apparatus 'A' according to the present invention will be described in details.

When electric power of the electric powder device 11 is turned on, direct current electric power is supplied to the electrode 10, and the high-density chlorine solution generated as the hydrochloric acid is electrolyzed at the diaphragmless electrolytic bath III is mixed and reacted with the dilution water, thus generating slightly weak acidic hypochlorous acid water.

At the same time, the electromagnetic valve 2 installed at the tube of the dilution water supply tube 1 is turned on, and the dilution water enters into the venturi tube IV through the static pressure valve 3 and the flow sensor 4. when the dilution water passes past the venturi tube IV connected in a T-shape to the top of the diaphragmless electrolytic bath III, the pressure may drop at the neck part 15 with the aid of a configuration of the neck part 15 which is a flow passage the diameter of which narrows between the inlet port of the venturi tube IV into which the dilution water flows and the outlet port from which the dilution water discharges, and the discharge tube 17 which is a vertical tube connected to an intermediate portion of the neck part 15 and communicating with the diaphragmless electrolytic bath III, for which even though the discharge pressure of the hydrochloric acid supply pump 7 is small, the high-density chlorine solution generated in the diaphragmless electrolytic bath III may be discharged from the diaphragmless electrolytic bath III through the outlet port of the venturi tube IV together with the dilution water.

The high-density chlorine solution containing vapor state chlorine generated in the diaphragmless electrolytic bath III may be efficiently mixed with the dilution water with the aid of the screw blade 19 which is a gas-liquid contact promoting unit installed at the generated water discharge tube 18 connected to the venturi tube IV, thus more increasing the generation of hypochlorous acid. The thusly generated slightly weak acidic hypochlorous acid water may be finally stored in the generated water storing container 20.

Meanwhile, if the supply amount of the dilution water is much, and the passage pressure of the dilution water supply tube 1 is higher than a predetermined pressure, the supply amount of the dilution water is regulated to a predetermined flow amount by manually regulating the static pressure valve 3 in the down direction. On the contrary, the passage flow amount of the dilution water lacks, the flow sensor 4 senses such lack and transfers to the control device 100 through the signal cable 103, and the electromagnetic valve 2 is turned off in response to the signal from the control device 100, and the supply of the electric power to the electrode 10 is cut off, so the operation of the manufacturing apparatus stops.

In addition, in case where the supply of the hydrochloric acid in the diaphragmless electrolytic bath is plenty or short because of the errors in the operation of the hydrochloric acid supply pump 7 or in case where the supply of hydrochloric acid stops since there is not hydrochloric acid in the hydrochloric acid tank 5, the level of the current at the electrode 10 may go down or up. If the level is low by detecting the level of the current using the current sensor 12, the control device 100 is controlled for the stroke of the hydrochloric acid supply pump 7 to increase, and in case where the value of the current does not go up even after a predetermined time after the stroke is increased, a message showing the lack of hydrochloric acid is displayed on the liquid crystal display panel 102. In case where the value of the current is increased, it needs to recover the routine to the normal operation by lowering the stroke of the hydrochloric acid supply pump 7.

When a predetermined amount of the dilution water passes through the water inlet unit 14 of the venturi tube IV the diameter of which is large and through the neck part 15 of the venturi tube the diameter of which is smaller, the passing speed of the dilution water becomes faster at the neck part 15, and the pressure drops thereat based on the following continuity equation (mathematic equation 1) and the Bernoulli equation (mathematic equation 2).

$$Q=Q_1=Q_2, A_1V_1=A_2V_2, \pi/4 D1_1^2 V_1=\pi/4 D_2^2 V_2 \quad \text{[Mathematic Equation 2]}$$

$$P_1/\rho + \tfrac{1}{2}V_1^2 = P_2/\rho + \tfrac{1}{2}V_2^2 \quad \text{[Mathematic Equation 2]}$$

In the present invention, if the inner diameter of the dilution water supply tube 1 is 7 mm, it is preferred that the tubular diameter of the neck part 15 of the venturi tube is in a range of 2.2 to 2.8 mm for the following reasons.

In the slightly weak acidic hypochlorous acid water manufacturing apparatus according to the present invention, if the targeted generation amount per hour of the generating apparatus was set 120 liters (L), and the supply amount of the dilution was set 2.0 liters per minute, and the inner diameter ($D_1$) of the dilution water supply tube 1 was set 7.0 mm, the pressure ($P_1$) inside of the dilution water supply tube 1 was measured, as a result of the measurement, the pressure was 0.36 kgf/cm², and the flow speed was 0.80 to 0.9 m per second, which was the same as 0.86 calculated based on the continuity equation.

Namely, $V_1 = Q/A_1 = [0.000033 \text{ m}^3/\text{s}]/[(0.007 \text{ m})^2(\pi/4)] = 0.86$ m/s Here, $V_1$ means the flow rate (m/s) per second at the water inlet unit 14 of the dilution water, and Q means the supply amount (m³/s) of the dilution water, and $A_1$ means the cross section area (m²) of the water inlet unit 14.

If the inner diameter ($D_1$) of the dilution water supply tube 1 was fixed at 7.0 mm, and the tubular diameter ($D_2$) of the neck part 15 was varied to 2.0 mm, 2.5 mm, and 3.0 mm, the flow rate ($V_2$) and the pressure ($P_2$) inside of the tube at the neck part 15 were calculated based on the Bernoulli equation, and a result of the calculation is shown in Table 1.

$$P_1 = P_2 + \tfrac{1}{2}\rho(V_2^2 - V_1^2) \quad \text{[Mathematic Formula 3]}$$

In the above formula, ρ means the density (1,000 kg/m³) of water.

TABLE 1

| D (mm) | | | P2 | |
|---|---|---|---|---|
| $D_1$ | $D_2$ | $V_2$ (m/s) | Pa (Pascal) | kgf/cm² |
| 7.0 | 2.0 | 10.5 | −1,950 | −0.2 |
| 7.0 | 2.5 | 6.7 | 13,200 | 0.135 |
| 7.0 | 3.0 | 4.7 | 24,600 | 0.250 |

As seen in the above table 1, as the tubular diameter of the neck part 15 narrows, the flow rate at the neck part 15 is proportional to the inverse number of the square of the ratio of the tubular diameter of the neck part 15 with respect to the tubular diameter of the water inlet unit 14, and the pressure inside of the tube at the neck part 15 increased 1.5 times the increase ratio of the tubular diameter as the tubular diameter increased.

If the tubular diameter of the neck part 15 is set 2.0 mm, and the pressure inside of the tube is a minus value, and the hydrochloric acid of the hydrochloric acid container 5 may pass through the electrolytic bath 9 without any operation of the supply pump 7, namely, in the uncontrolled state, and may possibly reach the neck part 15 along the discharge tube 17. The present invention excludes the above assumption. In case where the tubular diameter of the neck part 15 is 3.0 mm, the pressure at the neck part 15 is high, so there may be a problem in selecting the hydrochloric acid supply pump 7.

Therefore, it is preferred that if the inner diameter of the dilution water supply tube 1 is 7 mm, the tubular diameter of the neck part 15 may be in a range of 2.2 mm to 2.8 mm, so the control in the above range may be possible, and the pressure of the extrusion of hydrochloric acid of the pump 7 may decrease. More preferably, the tubular diameter of the neck part 15 of the venturi tube is 2.5 mm.

Figure 2:
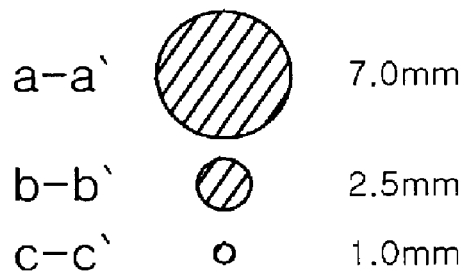
FIG. 2 is a cross sectional view taken along the lines a-a', b-b' and c-c' in FIG. 1.

FIG. 2 is a cross sectional view taken along the lines a-a', b-b' and c-c' in FIG. 1. If the inner diameter of the dilution water supply tube 1 is 7 mm, it is more preferred that the tubular diameter of the neck part 15 of the venturi tube is 2.5 mm, and most preferably, the tubular diameter of the discharge tube 17 is 1 mm.

The design condition is set when the generation capacity of the slightly weak acidic hypochlorous acid water per hour of the generation apparatus is set 120 liters, so the variations may be possible based on the continuity equation and the Bernoulli equation.

As the hydrochloric acid pump 7, a diaphragm pump a liquid contact unit of which is made from an acid resistance material, a gear pump, a vane pump, a piston pump, a tube pump, a finger pump, etc. may be used. However, in case of the electrolysis water wherein the generation amount of the slightly weak acidic hypochlorous acid water is 120 to 150 liters per minute, the supply amount of the hydrochloric acid into the electrolytic bath III may be 1.5 to 4.0 mL per minute based on the diluted hydrochloric acid of 2 to 6%, and due to the use of the venturi tube IV, the pressure at the neck part 15 orthogonal to the discharge tube 17 may be lowered more than 60% as compared with the pressure of the dilution water supply tube 1, so it is enough when the injection pressure of hydrochloric acid of the pump is above 0.15 to 0.20 kgf/cm², based on which it becomes possible to develop a small sized pump having the following spec.

Here, as a proper pump, a tube (hose) pump which was easy to manufacture at a relatively lower cost was selected. As a result of the tests after the tube pump having a variety of performances was installed at the slightly weak acidic hypochlorous acid water generating apparatus of the present invention, a new tube pump having the following performances was developed, thus achieving the objects of the present invention.

Namely, the hydrochloric acid supply pump 7 is preferably a tube pump which has a discharge capacity of 1 to 25 mL/min, the maximum discharge pressure of 10 to 30 kPa, a geared motor of 10 to 30V, 1 to 5 of the number of rollers, 1 to 5 of the minimum strokes per minute, and 0.1 to 1 mL of the discharge amount per stroke, and the tube pump having the conditions of the table 2 is more preferred.

TABLE 2

| | |
|---|---|
| Discharge capacity | 1.0~25.0 mL/min |
| Max discharge pressure | 30 kPa |
| Motor | 24 V geared motor |
| Number of rollers | 0.3 |
| Min stroke per minute | 0.3 |
| Discharge amount per stroke | 0.33 mL |
| Advantage | No variation in the amount of extrusion in case of negative pressure due to increase of temperature in electrolytic bath |

Figure 3:
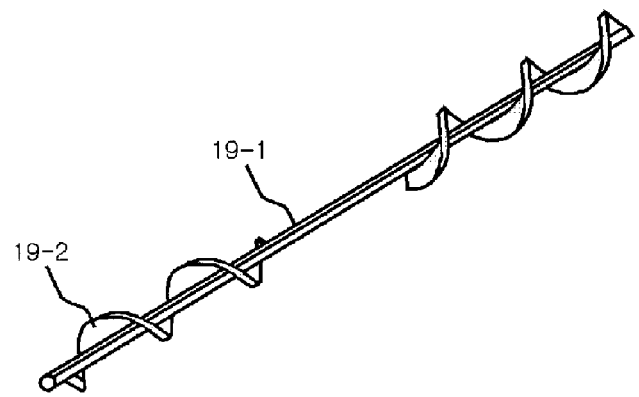
FIG. 3 is a perspective view illustrating a screw blade which is installed at a discharge tube of the apparatus for producing slightly weak acidic hypochlorous acid water according to the present invention.

Another feature of the present invention is using the screw blade 19. If enough reaction does not occur during the mixing reaction between the high-density chlorine solution generated based on the electrolysis in the diaphragmless electrolytic bath III and the dilution water, non-reacted chlorine remains mixed in a liquid phase and vaporizes in the generated water storing container 20, thus lowering the concentration of chlorine of slightly weak acidic hypochlorous acid water. For this reason, the sterilization power of the generated water may be weakened. In order to prevent the above phenomenon, the present invention is characterized in that the screw blade 19 in FIG. 3 is installed inside of the generated water discharge tube 18. The high-density chlorine solution and the dilution water flow making swirling turbulence in the discharge tube 18 with the aid of the screw blade 19, so enough reaction may take place, thus lowering the contents of the non-reacted chlorine.

FIG. 3 is a view illustrating an example of the screw blade which may be used in the present invention. The screw blade 19 may be formed of a shaft 19-1 and a blade 19-2 formed in a spiral shape along the longitudinal direction of the shaft 19-1.

The dilution reaction may be promoted by the swirling turbulence which is made since the screw blade 19 is installed inside of the discharge tube 18, and the high-density chlorine solution and the dilution water pass through the spiral passage formed by the inner wall of the discharge tube 18, the blade shaft 19-1 and the blade 19-2.

Since it needs for the screw blade 19 to be inserted inside of the discharge tube 18 and to have the same shape based on the shape of a tube shape such as a straight shape, a curve shape, a U-shape, etc. of the discharge tube 18, it is preferred that the screw blade 19 may be made from a plastic material such as a PE, PVC, etc. which has a bendable flexibility.

It was confirmed that stimulus chlorine smell was decreased in the generated water after the use of the screw blade 19. As seen in the Table 3 below, the effective chlorine concentration of slightly weak acidic hypochlorous acid water to which the technology of the present invention was applied maintained 96% in terms of the concentration at the initial stage of the generation one day after the generation, but the slightly weak acidic hypochlorous acid water was 80% in case where the technology of the present invention was not applied, because the non-reacted chlorine was not vaporized fast since enough gas-liquid contact was not performed in the slightly weak acidic hypochlorous acid water to which the technology of the present invention was not applied. The effective chorine concentration decreasing speeds after two days of the preservation period were same irrespective of the application and non-application of the technology of the present invention. As for the test method of the Table 3, generated water was inputted into the beakers 500 mL and 200 mL, respectively, and the beakers were stored in open and dark states, and the effective chlorine concentrations were measured using a digital colorimeter on regular time every day.

TABLE 3

| | Effective chlorine concentration of slightly weak acidic hypochlorous acid water (mg/L) | |
|---|---|---|
| Preservation period | No insertion of screw blade | Insertion of screw blade |
| 0 | 25 (100.) | 25 (100.0) |
| Day 1 | 20 (80.0) | 24 (96.0) |
| Day 2 | 18 (72.0) | 23 (92.0) |
| Day 3 | 17 (68.0) | 22 (88.0) |
| Day 4 | 16 (64.0) | 21 (84.0) |
| Day 5 | 15 (60.0) | 20 (80.0) |

Figure 4:
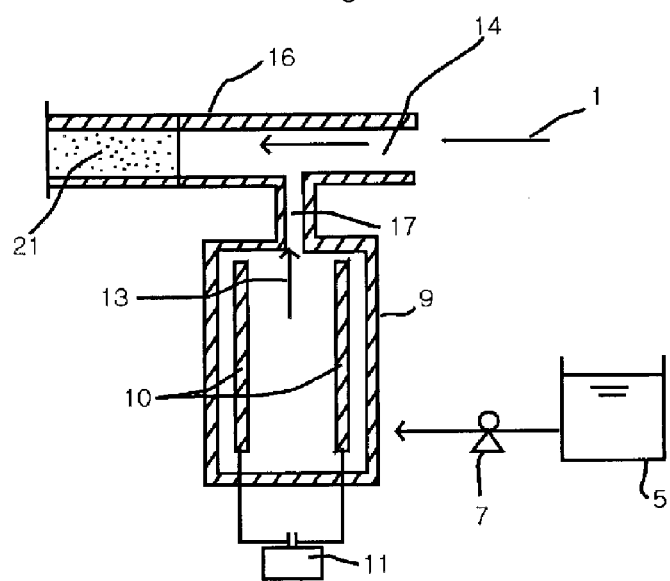
FIG. 4 is a view illustrating a configuration of a conventional apparatus for producing slightly weak acidic hypochlorous acid water.

According to the conventional method for enhancing the gas-liquid contact efficiency, for example, the method for charging in the discharge tube a non-woven fabric or a foaming agent made from acryl fiber or polyester fiber is used like in the gas-liquid contact member 21 in FIG. 4. However, according to the conventional method, as a result of the accumulating hours of use and of the compression which is continued, the spaces of the non-woven fabric may be diminished. In addition, since fine solid impurities contained in the dilution water occupy the pores of the non-woven fabric, it needs to frequently exchange with new ones, otherwise, the internal pressure inside of the tube increases, and the generated water may not discharge easily, for which the negative pressure may be formed inside of the electrolytic bath, which may be considered as causing a disadvantage.

Different from the above-described conventional art, the present invention is characterized in that in such a way that the screw blade which is a simple gas-liquid contact member is installed at the water outlet unit connected to the venturi tube, the gas-liquid contact may be efficiently acquired without installation of a complicated gas-liquid contact device, so the device may be made compact-sized, and the manufacturing cost of the device and the maintenance cost may be saved, thus enhancing the quality of products.

INDUSTRIAL APPLICABILITY

The present invention is characterized in that the screw blade which is a simple gas-liquid contact unit, is installed at the water outlet unit connected to the venturi tube in the apparatus for generating the slightly weak acidic hypochlorous acid water by diluting and reacting, with the dilution water, the high-density chlorine solution generated by feeding the diluted hydrochloric acid into the diaphragmless electrolytic bath and electrolyzing the same, the gas-liquid contact may be efficiently performed without installing the complicated gas-liquid contact device, so the size compactness of the device may be acquired, and the apparatus manufacturing cost and the maintenance cost may be saved, for which the present invention has industrial applicability.

The invention claimed is:

1. An apparatus for producing slightly weak acidic hypochlorous acid water, comprising:
   a hydrochloric acid container for storing hydrochloric acid as electrolyte;
   an electrolytic bath which is connected to the hydrochloric acid container and includes an electrode, and producing slightly weak acidic hypochlorous acid water containing high-density chlorine solution based on electrolysis with respect to the hydrochloric acid;
   a hydrochloric acid supply pump which is installed between the hydrochloric acid container and the electrolytic bath, thus supplying hydrochloric acid to the electrolytic bath;
   a venturi tube which is connected to an upper part of the electrolytic bath, is formed between an inlet and an outlet through which dilution water passes, includes a neck part connected having a tubular diameter smaller than the inlet and the output, and a discharge tube communicating the neck part and the electrolytic bath, thus sucking the slightly weak acidic hypochlorous acid water generated in the electrolytic bath based on the drop of the pressure at the neck part when dilution water passes by and diluting the slightly weak acidic hypochlorous acid water with the dilution water;
   a water discharge tube connected to the outlet of the venturi tube;
   a screw blade which is inserted into the discharging tube and configured to accelerates a gas-liquid contact between vapor state chlorine contained in the high-density chlorine solution and the dilution water by making swirling turbulence in the flow of discharge of the slightly weak acidic hypochlorous acid water;
   a dilution water supply tube connected to the mouth of the venturi tube;
   an electromagnetic valve, a static pressure valve and a flow sensor which are installed at the dilution water supply tube, thus controlling the flow rate or pressure of the dilution water;
   an electric power device for supplying electric power to the electrode of the electrolytic bath;
   a current sensor which is connected to the electrode of the electrolytic bath and is configured to measure the value of current;
   a control device which is connected through a signal cable to the hydrochloric acid supply pump, the electromagnetic valve, the static pressure valve, the electric power device and the current sensor, so as to controlling the hydrochloric acid supply pump, the electromagnetic valve, the static pressure valve, the electric power device and the current sensor, respectively; and
   an operation control panel which is connected to the control device for operating the control device;
   a liquid crystal display panel which is connected to the operation control panel for displaying various information;
   wherein, when the inner diameter of the dilution water supply tube is 7 mm, the tubular diameter of the neck part of the venturi tube is 2.2 to 2.8 mm, and the hydrochloric acid supply pump is a tube pump which has a discharge capacity of 1 to 25 mL/min, the maximum discharge pressure of 10 to 30 kPa, a geared motor of 10 to 30V, 1 to 5 of the number of rollers, 1 to 5 of the minimum strokes per minute, and 0.1 to 1 mL of the discharge amount per stroke.

* * * * *